(12) United States Patent
Todori et al.

(10) Patent No.: US 7,372,067 B2
(45) Date of Patent: May 13, 2008

(54) REFRACTIVE INDEX CHANGING APPARATUS AND METHOD

(75) Inventors: Kenji Todori, Yokohama (JP); Reiko Yoshimura, Kawasaki (JP); Fumihiko Aiga, Yokohama (JP); Tsukasa Tada, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 11/237,783

(22) Filed: Sep. 29, 2005

(65) Prior Publication Data

US 2006/0065902 A1    Mar. 30, 2006

(30) Foreign Application Priority Data

Sep. 30, 2004  (JP)  ............................... 2004-287960

(51) Int. Cl.
*H01L 29/06* (2006.01)
(52) U.S. Cl. ........................... 257/14; 257/33; 257/24; 257/E29.071; 977/774
(58) Field of Classification Search ..................... None
See application file for complete search history.

(56) References Cited

U.S. PATENT DOCUMENTS

| 5,936,258 | A * | 8/1999 | Imamura et al. ............... 257/21 |
| 6,281,519 | B1 | 8/2001 | Sugiyama et al. |
| 2002/0117660 | A1* | 8/2002 | Kim ............................... 257/21 |
| 2006/0065902 | A1 | 3/2006 | Todori et al. |

FOREIGN PATENT DOCUMENTS

| GB | 2 353 635 A | 2/2001 |
| JP | 9-17966 | 1/1997 |
| JP | 2002-217488 | 8/2002 |
| JP | 2002-261318 | 9/2002 |

OTHER PUBLICATIONS

Marzin et al., Photoluminescence of Single InAs Quantum Dots Obtained by Self-Organized Growth on GaAs, Aug. 1, 1994, Phys. Rev. Lett., vol. 73, No. 5, pp. 716-719.*

(Continued)

*Primary Examiner*—Evan Pert
*Assistant Examiner*—Scott R. Wilson
(74) *Attorney, Agent, or Firm*—Oblon, Spivak, McClelland, Maier & Neustadt, P.C.

(57) ABSTRACT

Refractive index changing apparatus includes quantum dots each having discrete energy levels including ground level and excited level, the excited level being higher than the ground level even if energy due to ambient temperature is provided on the quantum dots, barrier structure unit formed of dielectric which surrounds the quantum dots, injection unit configured to inject an electron into position of the ground level in each quantum dot via the barrier structure unit, utilizing tunneling effect, or to prevent injection of an electron into the position, injecting the electron or preventing injection of the electron controlled by changing an energy level of the injection unit, source which emits, to the quantum dots, first light beam having first energy for exciting electrons from the ground level to the excited level, and source which emits, to the quantum dots, second light beam having second energy different from the first energy.

15 Claims, 5 Drawing Sheets

OTHER PUBLICATIONS

U.S. Appl. No. 11/335,634, filed Jan. 20, 2006, Yoshimura et al.
U.S. Appl. No. 11/441,092, filed May 26, 2006, Yoshimura et al.
R. Prasanth, et al., "All-optical switching due to state filling in quantum dots", Applied Physics Letters, XP012061514, vol. 84, No. 20, May 17, 2004, pp. 4059-4061.
U.S. Appl. No. 11/690,989, filed Mar. 26, 2007, Todori et al.
Mark A. Greaney, et al., "Production, Spectroscopy, and Electronic Structure of Soluble Fullerence Ions", The Journal of Physical Chemistry, vol. 95, No. 19, 1991, pp. 7142-7144.
Stanley M. Smith, et al., "Static and Dynamic Polarizabilities of Conjugated Molecules and Their Cations", J. Phys. Chem. A, vol. 108, No. 50, 2004, pp. 11063-11072.
Junji Haruyama, "Single Electron Tunneling-Quantum Mechanics and Nanotechnologies", Corona Publishing Co., Ltd., First Edition, 2002, 8 pages.
U.S. Appl. No. 11/229,304, filed Sep. 19, 2005, Kenji Todori et al.

* cited by examiner

REFRACTIVE INDEX CHANGING APPARATUS AND METHOD

CROSS-REFERENCE TO RELATED APPLICATIONS

This application is based upon and claims the benefit of priority from prior Japanese Patent Application No. 2004-287960, filed Sep. 30, 2004, the entire contents of which are incorporated herein by reference.

BACKGROUND OF THE INVENTION

1. Field of the Invention

The present invention relates to a refractive index changing apparatus and method.

2. Description of the Related Art

Many researchers have done so far research and development of refractive index changing materials (see, for example, Jpn. Pat. Appln. KOKAI Publication No. 2002-217488). This is because the refractive index determines the propagation characteristic of a light beam, therefore control of a light beam can be realized by controlling the refractive index and spatial distribution of refractive indices. Resulting from the success of the development of refractive index control techniques that utilize liquid crystal, liquid crystal displays have been produced. Moreover, since refractive index changing is regarded as a main technique for optical computers, many researches on secondary or tertiary non-linear optical materials that provide the Pockels effect or Kerr effect have been executed in the field of refractive index changing techniques.

However, most changes in refractive index in a transparent region realized by the secondary or tertiary non-linear optical materials do not substantially exceed 1%. Although liquid crystal achieves a change of about 10% in refractive index, the use of liquid crystal is limited because it is a liquid. Further, when the supply of power to liquid crystal is stopped, records therein disappear.

BRIEF SUMMARY OF THE INVENTION

In accordance with an aspect of the invention, there is provided a refractive index changing apparatus comprising:

a plurality of quantum dots each having discrete energy levels including an energy level of a ground state and an energy level of an excited state, the excited level being higher than the ground level even if energy due to an ambient temperature is provided on the quantum dots;

a barrier structure unit formed of a dielectric which surrounds the quantum dots;

an injection unit configured to inject an electron into a position of the ground level in each of the quantum dots via the barrier structure unit, utilizing a tunneling effect, or to prevent injection of an electron into the position, injecting the electron or preventing injection of the electron controlled by changing an energy level of the injection unit;

a first light source which emits, to the quantum dots, a first light beam having first energy for exciting electrons from the ground level to the excited level; and a second light source which emits, to the quantum dots, a second light beam having second energy different from the first energy.

In accordance with another aspect of the invention, there is provided a refractive index changing method comprising:

emitting, to a plurality of quantum dots, a light beam for exciting an electron from a position of a ground level of each quantum dot to an excited level, the quantum dots each having discrete energy levels including the ground level and the excited level, the excited level being higher than the ground level even if energy due to an ambient temperature is provided on the quantum dots; and injecting the electrons into the ground level of each quantum dot utilizing a tunneling effect, or preventing the electrons from being injected into the ground level of each quantum dot by varying an energy level of an injection unit for injecting electrons into the quantum dots, via a barrier structure unit formed of a dielectric which surrounds the quantum dots.

DETAILED DESCRIPTION OF THE INVENTION

A refractive index changing apparatus and method according to an embodiment of the invention will be described in detail with reference to the accompanying drawings.

The embodiment has been developed in light of the above, and aims to provide a refractive index changing apparatus capable of achieving a rate of change in refractive index that exceeds 1% even in a transparent, and capable of recording a change in refractive index. The embodiment also aims to provide a refractive index changing method for use in the refractive index changing apparatus.

The refractive index changing apparatus and method of the embodiment can exhibit a refractive index change of more than 1% in a transparent region, and can record the refractive index change.

Figure 1:
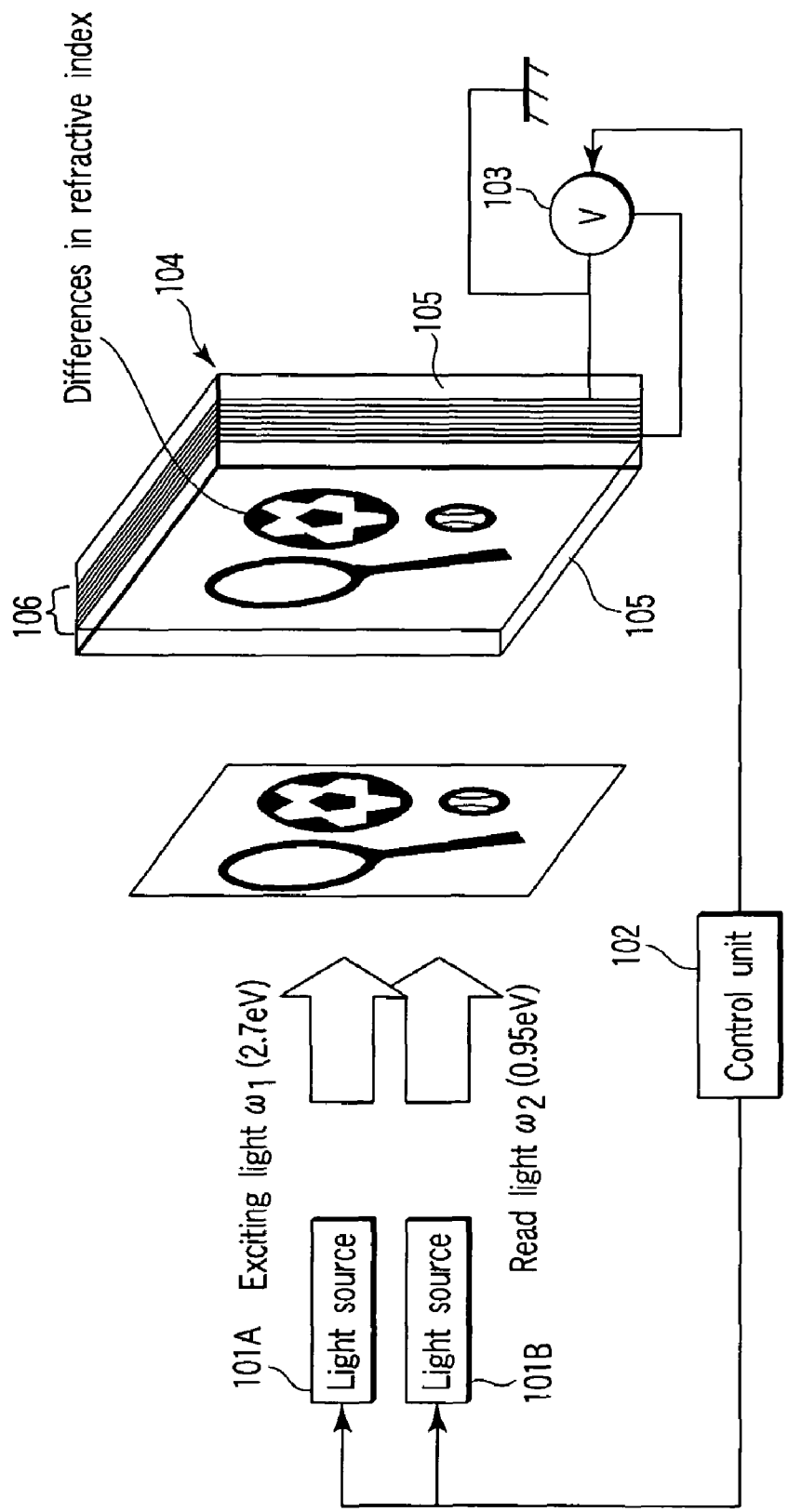
FIG. 1 is a view illustrating a refractive index changing apparatus according to an embodiment of the invention.

As shown in FIG. 1, the refractive index changing apparatus of the embodiment comprises light sources 101A and 101B, a control unit 102, an energy level control unit 103 for an electron injection unit, and a refractive index changeable element structure 104. The refractive index changeable element structure 104 comprises, for example, indium-tin oxide (ITO) transparent electrodes 105 as the electron injection unit, and a quantum structure 106 including a plurality of quantum dots and a barrier structure. The transparent electrodes 105 may be formed of glass plates providing the opposite sides of the index changeable element structure 104 and holding the quantum structure 106 therebetween.

Quantum dots mean a $0^{th}$ dimensional electron system in which state density energy is made discrete by blocking in electrons in dot regions having a size substantially equal to the de Broglie wavelength of an electron. Quantum dots have discrete energy levels, and are formed of at least one selected from the group containing of metal fine particles, semiconductor fine particles, fullerene molecules, carbon nanotube and organic molecules. Further, in the barrier structure, electron tunneling occurs when the electron energy is substantially equal to the energy level of the quantum dots.

The light sources 101A and 101B generate a light beam having energy designated by the control unit 102. The light beam generated by them is applied to the refractive index changeable element structure 104. The light source 101A generates, for example, excitation light beam for exciting the electrons of quantum dots in the refractive index changeable element structure 104. The light source 101B generates, for example, a read light beam for changing the refractive index the refractive index changeable element structure 104 to reproduce recorded images. Preferably, the energy of the read light beam is set to a value that prevents the light beam from being completely absorbed by the quantum dots and barrier material. For instance, it is preferable that the energy is adjusted so that the transmittance of the light beam through the refractive index changeable element structure 104 is 50% or more. The energy of the excitation light will be described later in more detail, referring to FIG. 3.

The control unit 102 controls the refractive index changing apparatus. It determines, for example, the intensity of the light beams emitted from the light sources 101A and 101B. Further, under the control of the control unit 102, the energy level control unit 103 for the electron injection unit controls the energy level of the electron injection unit to enable it to inject electrons into the refractive index changeable element structure 104.

Electrons having energy designated by the energy level control unit 103 are injected from the electron injection unit 105 to the quantum structure 106, utilizing a tunneling effect that is acquired by controlling the energy level of the electron injection unit 105. According to Schrödinger equation, unless the barrier layer is thin, the probability of occurrence of the tunneling effect is remarkably low, therefore the barrier layer must be formed relatively thin. Concerning the thickness of the barrier layer, a description will be given later with reference to FIG. 3. The electron injection unit 105 may be formed of a pair of electrodes with the refractive index changeable element structure 104 interposed therebetween, or may be formed of the combination of the probe of a near-field scanning optical microscope (NSOM) and one of the ITO transparent electrodes 105. Electrons are injected into the quantum structure 106 by these elements.

The refractive index changeable element structure 104 has a structure in which polystyrene films containing quantum dots are held between the ITO transparent electrodes 105. The quantum structure 106 includes quantum dots of, for example, $C_{60}$ and a barrier structure formed of the polystyrene films. The quantum dots are formed of at least one selected from the group consisting of metal fine particles, semiconductor fine particles, fullerene molecules, carbon nanotube and organic molecules. In the quantum structure 106, the barrier structure containing the quantum dots provides quantum dots having an energy level of a quantum-well type.

The principle of the refractive index changing apparatus according to the embodiment will be described.

The refractive index is related to the energy gap between the ground level (highest occupied molecular orbital (HOMO); single occupied molecular orbital (SOMO)) and the excited level (lowest unoccupied molecular orbital (LUMO)).

When the electron injection unit 105 has injected electrons into the quantum dots of the quantum structure 106, a new outermost orbital (i.e., a higher energy highest occupied molecular orbital) is formed outside the existing outermost orbital (i.e., highest occupied molecular orbital) that significantly contributes to the determination of the refractive index. If this new outermost orbital is maintained, a great refractive index change effect is maintained.

Thus, in the embodiment of the invention, when electrons are injected from the electron injection unit 106 into the quantum structure 106, they are maintained on a new outermost orbital, which means that a change in the refractive index of the refractive index changeable element structure 104 is maintained. Accordingly, in the refractive index changing apparatus of the embodiment, once electrons are injected, it is not necessary to inject further energy from the electron injection unit 105. If the refractive index changing apparatus of the embodiment is regarded as a recording apparatus, the light source 101A, the energy level control unit 103 for the electron injection unit 105, and the electron injection unit 105 correspond to a write apparatus. Similarly, the quantum structure 106, into which electrons are injected, corresponds to a recording medium (refractive index changeable medium).

The refractive index changing apparatus and method of the embodiment provide a new refractive-index-changing mechanism, and can realize a greater change in refractive index than the prior art.

Figure 2:
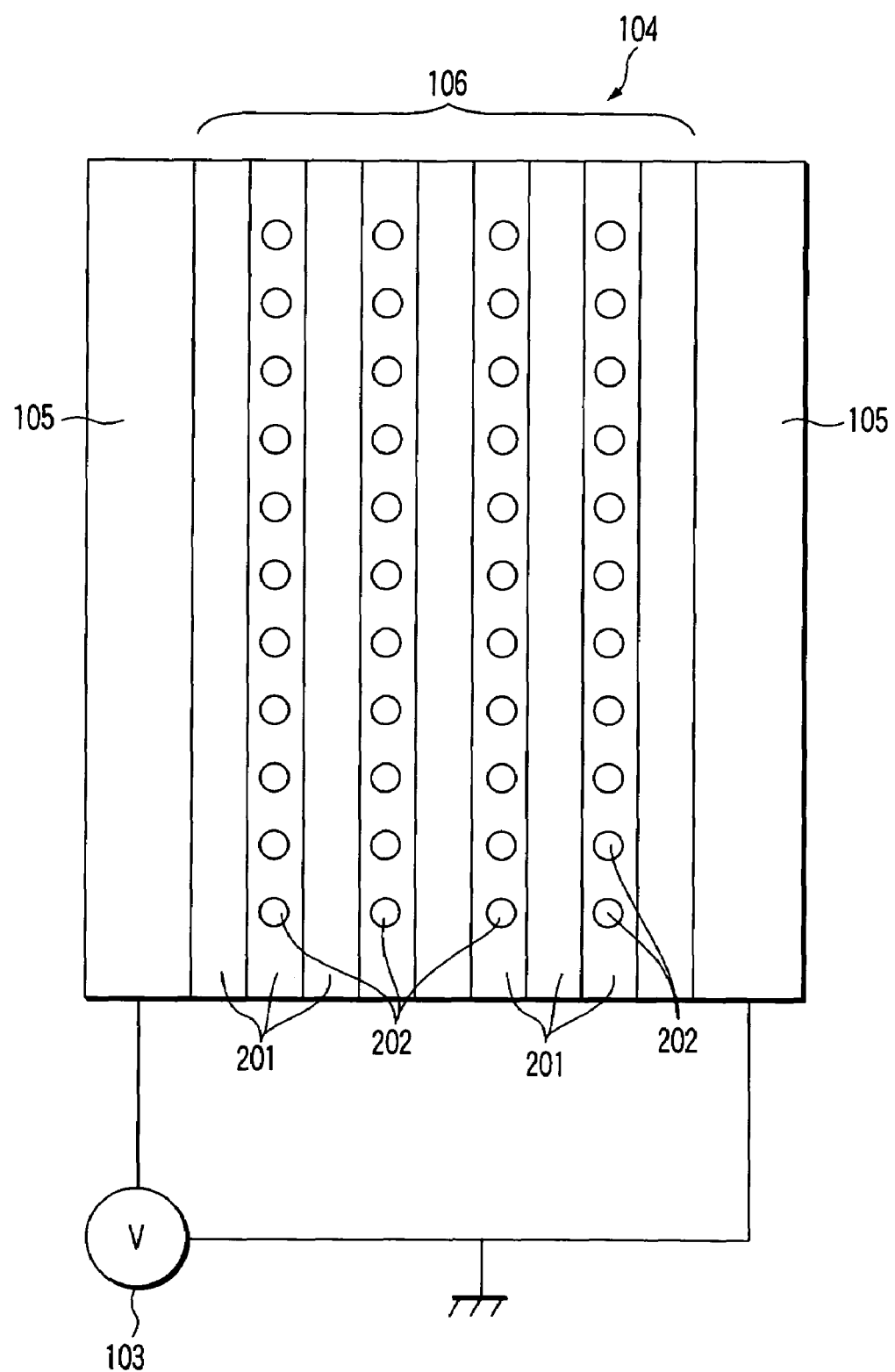
FIG. 2 is a view illustrating the refractive index changeable element structure.

Referring now to FIG. 2, the structure of the refractive index changeable element structure 104 will be described.

As shown in FIG. 2, the refractive index changeable element structure 104 comprises the ITO transparent electrodes 105 and quantum structure 106. The quantum structure 106 includes a barrier structure formed of a plurality of barrier layers 201, and a plurality of quantum dots 202.

As can be understood from FIG. 2, the quantum structure 106 is held between the two ITO transparent electrodes 105. The quantum structure 106 is formed by alternately stacking a barrier layer 201 containing quantum dots, and a barrier layer 201 containing no quantum dots. Each ITO transparent electrode (electron injection unit) 105 is connected to the energy level control unit 103 for the electron injection unit. Electrons are injected by a tunneling effect from one of the ITO transparent electrodes 105 to the quantum structure 106. It is preferable that each barrier layer 201 has a specific inductive capacity of 7 or more.

The refractive index changeable element structure 104 is required to have an energy level of a quantum-well type, and includes the quantum dots 202 and barrier structure 201. Further, to enable electrons to be injected into the quantum dots 202 under the control of the control unit 102, the ITO transparent electrodes 105 and the energy level control unit 103 for them are provided. Furthermore, to keep the quantum dots 202 with electrons injected therein in a stable state, and to enable the relative relation between the Fermi level, which is energy level of the ITO transparent electrodes 105 into which electrons are injected, and the energy level of the quantum dots 202 to be changed, the energy level control unit 103 is connected to the ITO transparent electrodes 105. The injection of electrons will be described later with reference to FIG. 3.

Since the refractive index changeable element structure 104 is an optical function element, it requires a light entrance unit and an emission unit. The ITO transparent electrodes 105, which are transparent, serve as the light entrance unit and the emission unit. In the case of FIG. 2, an exciting or read light beam enters one of the left and right ITO transparent electrodes 105, and a light beam having passed through the quantum structure 106 is emitted from the other of the left and right ITO transparent electrodes 105.

The quantum dots may be formed of, for example, metal nano particles, semiconductor nano particles, organic molecules, etc. Typical nano particle materials of the quantum dots are metals, such as Cu, Au, Ag, Fe and Ni, III-V group semiconductors, such as Si, Ge, Sn, Pb, diamond, GaAs, AlAs, InAs, Gap and InSb, II-VI group semiconductors, such as ZnS, ZnSe, ZnTe, CdS, CdSe and CdTe, organic molecules, such as $C_{60}$ and carbon nanotube, and inorganic molecules. Further, the barrier structure may preferably be formed of a material, such as glass and polymer, which has a large energy gap between the ground level (HOMO, SOMO) and the excited level (LUMO), and which does not absorb a light beam of a wavelength for exciting quantum dots. The material may preferably pass 50% or more a read light beam therethrough that has passed through the index changeable element structure 104.

As the material of the barrier structure, tertiary non-linear optical materials are not preferable because of the following reason. It is known that a tertiary non-linear optical material applies an electric field to quantum dots by a quantum effect to thereby modulate the wave function of an electron or exciter and increase the rage of change in refractive index. However, a change in refractive index due to a tertiary non-linear optical material is smaller by one, two or more digits than that in refractive index due to the refractive changing apparatus of the embodiment. In the tertiary non-linear optical effect, if the level of the electric field is increased, the change in refractive index is theoretically increased relatively. Actually, however, the material may well be broken by the strong electric field, and the rates of change reported so far fall within almost 1% or less. Further, in the case of utilizing the tertiary non-linear optical effect, no electrons are injected unlike the refractive index changing apparatus of the embodiment, and in general, the barrier layer is made thick so that it can resist against a strong electric field.

Figure 3:
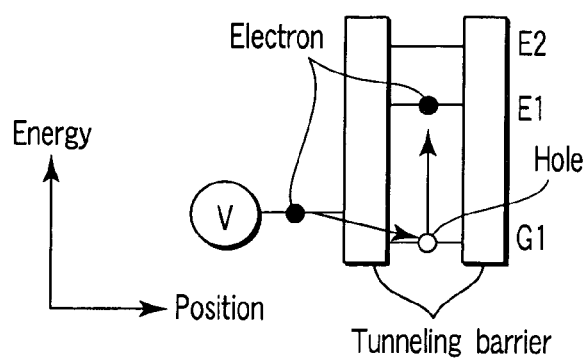
FIG. 3 is a view useful in explaining a phenomenon caused by an exciting light beam and electron injection utilizing an exciting light beam.

Referring to FIG. 3, a phenomenon concerning a exciting light beam generated by the light source 101A will be described.

As shown in FIG. 3, the light source 101A applies, to the index changeable element structure 104, a light beam having energy corresponding to the energy gap between the ground level G1 of each quantum dot and an excited level E1 just above the ground level. At this time, one electron at the ground level G1 absorbs the energy of the exciting light beam and is excited to the excited level E1. The exciting light beam has energy resonant with the energy level of the quantum dots, and the energy of the exciting light beam is called resonant energy.

Further, at this time, the electron injection unit 105 injects an electron into a hole formed by the exciting light beam in a quantum dot at the ground level G1. Since one electron is injected into the hole at the ground level G1, no more electrons will drop from the excited level E1 to the ground level G1 while irradiating energy. Namely, when an electron is injected into a hole at the ground level G1, an electron at the excited level E1 can exist at this level in a stable manner.

More specifically, the energy level control unit 103 for the electron injection unit determines the energy level of an electron to be injected by the electron injection unit 105, in the following manner. Electrons existing at the ground level G1, excited level E1, etc., always acquire or emit energy depending upon temperature. Namely, the ground level G1, excited level E1, etc., widen their widths by the energy corresponding to temperature. If not influenced by temperature, it can be said that the energy level has no width like the delta function. Actually, however, assume that the energy level has a width corresponding to a state density distribution, and that the height or magnitude of the energy level includes all the width range. The width is determined in a narrow sense by the Fermi-Dirac distribution function, and is known to be substantially indicated by kT (k: Boltzmann constant [approximately $8.61 \times 10^{-5}$(eV/K)]; T: Temperature (unit is K[kelvin]). Accordingly, it is sufficient if the energy level control unit 103 for the electron injection unit causes the electron injection unit 105 to inject, into the index changeable element structure 104, electrons having energy of the width kT around the ground level G1 (i.e., the energy between (G1−kT) and (G1+kT)). More preferably, the energy level control unit 103 for the electron injection unit causes the electron injection unit 105 to inject, into the index changeable element structure 104, electrons having energy higher by kT than the ground level G1 (i.e., higher than G1 and lower than (G1+kT)). When the energy level control unit 103 for the electron injection unit causes the electric potential of the portion of the electron injection unit 105 connected to the index changeable element structure 104 to be increased to a value higher by kT (eV) or more than the ground level G1, the electrons at the ground level G1 cannot return to the electron injection unit 105. This prevents the electrons at the excited level from dropping to the ground level G1, and maintains them in a stable state.

Further, in the embodiment, where the energy level control unit 103 does not control the electron injection unit 105, the energy level of the electron injection unit 105 is set higher by kT (eV) or more higher than the ground level of the quantum dots. When the energy level control unit 103 has controlled the electron injection unit 105 to inject electrons into the quantum structure 106 by tunneling injection, and has stopped control after electron injection, the interaction between the electron injection unit and the ground level of the quantum dots will be none in practice. As a result, the electrons at the ground level G1 do not return to the electron injection unit 105, and the electrons at the excited level do not drop to the ground level G1 and keep in a stable state.

Thus, the refractive index changing apparatus of the embodiment can prevent, from dropping to the ground level G1, electrons that are at the excited level when no power is consumed, i.e., can keep them in a stable state. In this case, it is necessary to prepare materials for the quantum dots and the electron injection unit, which enable each of the ground level G1 and the excited level E1 to be kept different from the energy level of the electron injection unit, regardless of variations in the energy level of electrons due to temperature. Namely, in the quantum dots, the energy gap between the ground level G1 and the excited level E1 is greater than 2 kT. If the difference between the ground level G1 and the energy level of the electron injection unit, and the difference between the excited level E1 and the energy level of the electron injection unit are each kT or more, a change in refractive index can be maintained with little power consumption. Further, when this condition is satisfied, the energy higher by kT than the ground level G1 is set lower than the energy lower by kT than the excited level E1, in order to prevent the electron injection unit 105 from injecting electrons into quantum dots kept at the excited level E1. The energy lower by kT than the excited level E1 is set in light of the case where the excited level E1 is varied because of temperature. In other words, the condition that the excited level E1 is higher by 2 kT or more than the ground level G1 is also satisfied.

It is also preferable to prepare a material for the quantum dots that prevents the excited level E1 from becoming equal to or more than an excited level E2 set higher than the level E1, even if the energy level is destabilized because of the disturbance of electrons by temperature. Namely, it is preferable that the energy gap between the excited levels E1 and E2 of the quantum dots is greater than 2 kT.

A tunneling barrier must be provided at a certain position between the electron injection unit 105 and the quantum dots that cause a change in refractive index. If a tunneling barrier is provided between the electron injection unit 105 and the quantum dots, no tunneling barrier may be provided between the quantum dots. However, in the quantum dots, discrete energy levels must be maintained.

In contrast, if a tunneling barrier is provided between the quantum dots, it is not necessary to provide a tunneling barrier between the surface of the group of the quantum dots and the electron injection unit 105. In this case, the quantum dots located at the surface of the group function as part of the electron injection unit 105. If the difference between the Fermi level (=electron energy level of the electron injection unit 105) and the ground level or excited level of the quantum dots is small, electrons excited to the excited level by an exciting light beam will soon drop to the ground level. In other words, the electrons at the excited level are varied in level by the energy of temperature, whereby the electrons and holes will be recombined soon. Unless no electron exists at the excited level, no change in refractive index occurs. Therefore, the energy level control unit 103 for the electron injection unit determines from the energy level of the electrode whether the refractive index should be varied.

Where the electron-excited state is kept as described above, the real part of the complex refractive index is changed. The greater the difference between the energy gap of the excited levels E1 and E2 and that of the ground level G1 and the excited level E1, the greater the rate of change of the real part. Further, the smaller the dot size, the lower the electron density at the excited level E1, and the more easily saturation occurs, the greater the change in refractive index. The rate of change in refractive index when the electrons are kept excited is as high as 10% or more, which is higher by two digits or more than in the conventional non-linear optical materials.

The change in the real part of the refractive index of the refractive index changeable element structure 104 caused by an exciting light beam ω1 emitted from the light source 101A enables a read light beam ω2, emitted from the light source 101B to the unit 104, to read therefrom a refractive-index-changed pattern written by the an exciting light beam, even though the unit 104 is transparent. On the other hand, to release the excited state of electrons, the energy level of the electron injection unit is set to a value corresponding to energy slightly lower than the ground level G1 or excited level E1. As a result, the original state is recovered by generating a hole and emitting a light beam or by directly moving electrons from the quantum dots at the excited level E1 to the electron injection unit. Thus, a refractive-index-changed pattern recorded in the refractive index changeable element structure 104 is deleted. As described above, the refractive index changing apparatus of the embodiment can be used as a recording apparatus for recording moving pictures, analog data, digital data, etc.

As described above, in the refractive index changing apparatus of the embodiment, electrons can be kept in an excited state, whereby the refractive index of the refractive index changeable element structure 104 can be kept stabilized, and the refractive index of part of the structure 104 can be changed.

To inject electrons into the quantum structure 106, the tunneling effect of the electrons is utilized. When the barrier structure 201 is thin, tunneling of electrons will easily occur. The tunneling effect depends upon the thickness of the barrier structure 201 that provides a tunneling barrier. The probability of occurrence of the tunneling effect can be computed based on the Schrödinger equation. The thinner the barrier structure 201, the more easily the tunneling effect occurs.

More specifically, the tunneling effect is a phenomenon occurring in a quantum mechanical system, in which when an electron of energy E lower than potential $V_0$ collides with a barrier of potential $V_0$, it passes through the barrier. This occurs when the probability t is not zero both inside and outside the barrier. According to the Schrodinger equation, the rate of transmission of electrons through the barrier, i.e., the probability t of the tunneling effect is given by the following equations (see, for example, Junji Haruyama, "Single Electron Tunneling-Quantum Mechanics and Nano-technologies-", Corona Publishing co., ltd, Tokyo JAPAN, 2002, First Edition).

$$t = \frac{4E(V_0 - E)}{V_0^2 \sinh^2\left(\frac{a}{2b}\right) + 4E(V_0 - E)}$$

$$b = \frac{\hbar}{2\sqrt{2m_0(V_0 - E)}}$$

where $m_0$ represents the mass of an electron, h a Dirac constant (=h/2π), and a the thickness of a tunneling barrier.

From these equations, it can be understood that the thinner the thickness a of the barrier, the more easily tunneling occurs.

Further, when electrons are injected into the quantum dots 202 accumulated in the quantum structure 106 and having discrete energy levels, coulomb blockade may occur. When coulomb blockade occurs, electrons are trapped by the quantum dots 202 and stabilized. To cause coulomb blockade to occur, the following three conditions must be satisfied:

$$kT << E_C$$

$$R_T >> \frac{h}{e^2} = R_Q$$

$$Re(Z_t(\omega)) >> R_Q$$

where k is the Boltzmann constant, T is the temperature, $R_T$ is the junction tunneling resistance, $R_Q$ is the resistance quantum (25.8 kΩ), and Re(Zt(ω)) is the real part of an environmental impedance in electromagnetic field. Further, $E_c$ represents charge energy given by the following equation:

$$E_C = \frac{e^2}{2C_j}$$

where $C_j$ is the junction capacitance given by the following equation:

$$C_j = \frac{\varepsilon S}{a}$$

where $\varepsilon$ is the dielectric constant, and S is the junction area.

It is necessary to form the barrier structure 201 as thin as enables electrons to tunnel their ways through it. It is also necessary to set the charge energy (equal to an increase in the energy level of the quantum dots) of the barrier structure 201 higher than the ambient temperature energy kT (k: Boltzmann constant; T: absolute temperature). This means that it is necessary to make the electrostatic capacitance of the barrier structure 201 small, whereas the film thickness of the barrier structure 201, which is one of the factors for determining the electrostatic capacitance, must be set to such a low value as enables electrons to tunnel their ways through the barrier structure. In addition, the junction area, i.e., the surface area of the quantum dots, is very important, and it is necessary to form each quantum dot to a small size.

In light of the energy level, coulomb blockade is determined based on the relationship between the Fermi level (=energy level of the electrode) and the energy level ($E_c$) of the quantum dots into which an electron is injected by tunneling. It is sufficient if $E_c$ is varied by kT or more when one electron is injected.

The advantage of the refractive index changeable element of the embodiment remarkably differs from that acquired by the prior art in which the refractive index of a structure is changed using a secondary or tertiary non-linear optical effect represented by the Pockels effect. The differences therebetween will now be described.

(1) In the prior art, electrons are kept in the electrodes for applying an electric field to a structure. In contrast, in the embodiment of the invention, electrons are moved from the electron injection unit (electrode) to quantum dots contained in the structure.

(2) In the prior art, when the application of a voltage to the structure is stopped, the non-linear optical effect and hence the refractive index changed state disappear. In contrast, in the embodiment of the invention, as long as electrons stay in the quantum dots, the refractive index changed state is kept.

(3) In the Pockels effect of the prior art, the rate of change in refractive index is as low as about $10^{-3}$. In contrast, in the embodiment of the invention, the rage of change is $10^{-1}$ or more.

(4) In general, there are some methods, such as photochromism, for changing absorption spectra. Further, as can be understood from Kramers-Krönig relation, a relatively great change in refractive index near the light-absorbing end of the quantum structure 106 can be realized. Accordingly, a method for changing the absorption spectrum or absorption coefficient to change the real part of the refractive index is often utilized. However, it is difficult to significantly change the refractive index in a transparent region. On the other hand, in the embodiment of the invention, a great change in refractive index can be realized even in a transparent region.

(5) In the case of a general three-dimensional bulk semiconductor, a large number of charges exist in a single excited band branch, therefore when a single electron is injected, little change occurs in the distribution of electrons that occupy the band (energy level) branch. In contrast, in the embodiment of the invention, since the quantum dots have discrete energy levels, only a small number of electrons exist at each energy level. Therefore, if a new single electron is injected into a quantum dot, it occupies an energy level that has not been occupied so far. Further, since the quantum dots have discrete energy levels, the width of each absorption spectrum is narrow and hence a large transparent region is left.

(6) The refractive index changing element according to the embodiment of the invention aims to control the transmission/reflection of a light beam and to optically record information, which differs from a laser or amplifier that utilizes absorption or resonance of a light beam. Therefore, the wider the wavelength region that can transmit a light beam therethrough, the wider the application range of the refractive index changing element as an optical device. Moreover, the embodiment of the invention differs in both principle and advantage from the quantum-dot exciter for amplifying the tertiary non-linear optical effect utilizing an absorption/resonance effect. Namely, the embodiment provides the advantage that the refractive index can be changed even in a transparent region.

(7) In the embodiment of the invention, the portion of the refractive index changeable element structure 104 other than the quantum dots does not change in refractive index. Therefore, the higher the density of the quantum dots, the greater the rate of change in the refractive index of the entire unit 104. When the refractive index changing element of the embodiment is used as a waveguide, it is advantageous to set the density of the quantum dots so that the rate of change in refractive index at least exceeds 1.5%. 1.5% is a general value to which the rate of change in the refractive index of a currently used waveguide is set.

In relation to the above-described differences, a further description will be given of the principle of the refractive index changing element. The light beam entering a quantum dot excites the electron shell by its electric field (excitation). The excited electron shell emits a light beam. The process of emission at this time relates to the Einstein B coefficient, and a certain time is required from excitation to emission even in a non-resonance region. A light beam propagates while repeating excitation and emission. The time required for excitation/emission determines the phase velocity $V_p$ of light propagation. Assuming that the velocity of a light beam in vacuum is C, $V_p/C$ represents the real part of the refractive index changed by the refractive index changing apparatus of the embodiment. The refractive index is related to the molecular polarizability by the following Lorentz-Lorenz equation:

$$\frac{n^2-1}{n^2+2} \cdot V_{mol} = \frac{4\pi}{3} \cdot N_A \cdot \alpha \equiv R_0$$

$$\frac{n^2-1}{n^2+2} \cdot V = \frac{4\pi}{3} \cdot \alpha = \frac{R_0}{N_A}$$

$$\frac{n^2-1}{n^2+2} = \frac{4\pi}{3} \frac{\alpha}{V}$$

where $N_A$ is the Avogadro number, and $V_{mol}$ is the volume of 1 mol ($N_A$: $6.02\times10^{23}$). Further, the following equation is established:

$$\rho = \frac{M}{V_{mol}}$$

Therefore, the following equation (Lorentz-Lorenz equation) can be derived:

$$\left\{\left(\frac{n^2-1}{n^2+2}\right)\right\}\frac{M}{\rho} = \left(\frac{4\pi}{3}\right)N_A\alpha,$$

where n is the refractive index, M is the mass of 1 mol, $\rho$ is the density, and $\alpha$ is the polarizability.

In general, to change the molecular polarizability, an electric field is applied to distort the orbital of an electron, utilizing the secondary or tertiary non-linear optical effect. However, the rate of change in polarizability realized by this method is low. In contrast, when an electron is injected into a quantum dot of a nano scale, a new orbital is formed and coulomb repulsion occurs, whereby the chemical potentials of HOMO or LUMO and the energy gap between HOMO and LUMO are significantly changed. As the effect of this, the polarizability is also significantly changed. On the other hand, when an electron is emitted from a quantum dot, no new orbital is formed, with the result that the rate of change in polarizability is lower than in the case of injecting an electron into a quantum dot. However, even when an electron is emitted from a quantum dot, a greater polarizability change can be expected than in the prior art where polarizability change is achieved by a non-linear optical effect.

Further, in general, when an excessive number of electrons are injected into quantum dots, the quantum dots are liable to be hard to stabilize. On the other hand, if a dielectric is provided around the quantum dots as in the embodiment of the invention, the entire energy is stabilized because of dielectric relaxation, and the rate of change in polarizability is increased. When electrons are injected, if the energy level of the LUMO of the barrier structure is set higher than that of each quantum dot, electrons are captured by the quantum dots.

Figure 4:
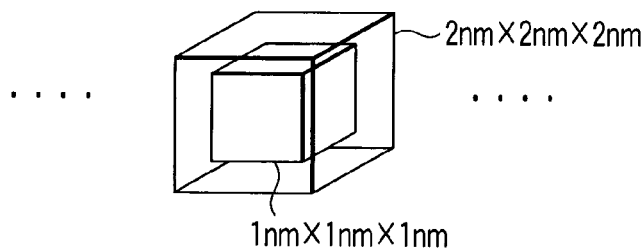
FIG. 4 is a view illustrating quantum dots and a barrier structure model surrounding the dots.
Figure 5:
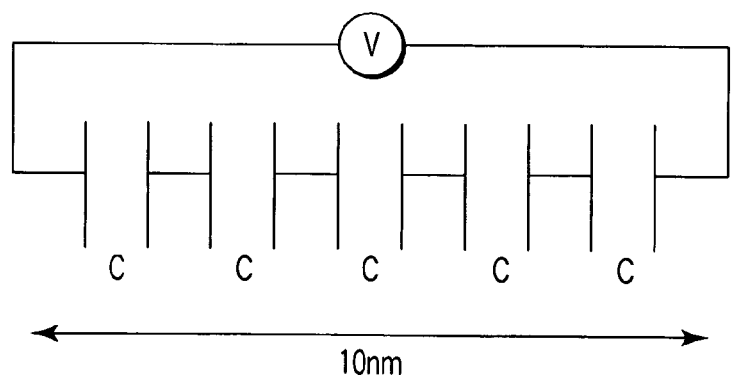
FIG. 5 is a view illustrating a circuit for generating a driving voltage used for electron injection.

The voltage applied during injection of electrons can be roughly determined, regarding, as capacitors, dielectric members isolating the quantum dots from each other, and regarding the electrodes and capacitors as a series circuit. As a model, it is assumed that a barrier structure with a thickness of 0.5 nm surrounds a cubic quantum dot having sides of 1 nm as shown in FIG. 4, and that five such cubic quantum dots arranged in series form capacitors as shown in FIG. 5. A voltage V is computed assuming that electrons are accumulated in the respective capacitors. The relationship V=Q/C is established between the voltage V, the capacitance C of each capacitor and the charge Q. Further, C is given by the following equation:

$$C = \epsilon_0 \epsilon_r S/d,$$

where $\epsilon_0$ is the dielectric constant ($\epsilon_0 = 8.85 \times 10^{-12}$ F/m), $\epsilon_r$ is the relative dielectric constant, S is the area of each electrode of a capacitor, and d is the distance between the adjacent electrodes of the capacitor.

In the above model, $S = 1 \times 10^{-18}$ m$^2$, and $d = 1 \times 1 - 10^{-9} \times 5$ [m]. The total thickness including the quantum dots is 10 nm. Further, since the charge Q corresponds to the five electrons injected into the quantum dots, $Q = e \times 5 = 1.6 \times 10^{-19}$ [C]$\times 5 = 8 \times 10^{-19}$ [C].

If $\epsilon_r = 10$, $C = 1.8 \times 10^{-20}$, therefore V is approximately 44V. Assuming that the total thickness is 100 nm, if $\epsilon_r = 10$, V is about 440 volts, while if $\epsilon_r = 100$, V is approximately 44 volts. Further, if $\epsilon_r = 1000$, V is about 4.4 volts. Thus, electrons can be easily injected. In the above model, $\epsilon_r$ is approximately 880 and the driving voltage is about 5 volts. In light of the driving voltage, this relative dielectric constant is preferable. To increase the thickness, the electrodes may be each formed of a plurality of layers. Further, no problem will occur even if the quantum dots are arranged in parallel with the electrodes.

The refractive index changing apparatus of the embodiment will be described using specific experimental examples.

EXPERIMENTAL EXAMPLE 1

Figure 6:
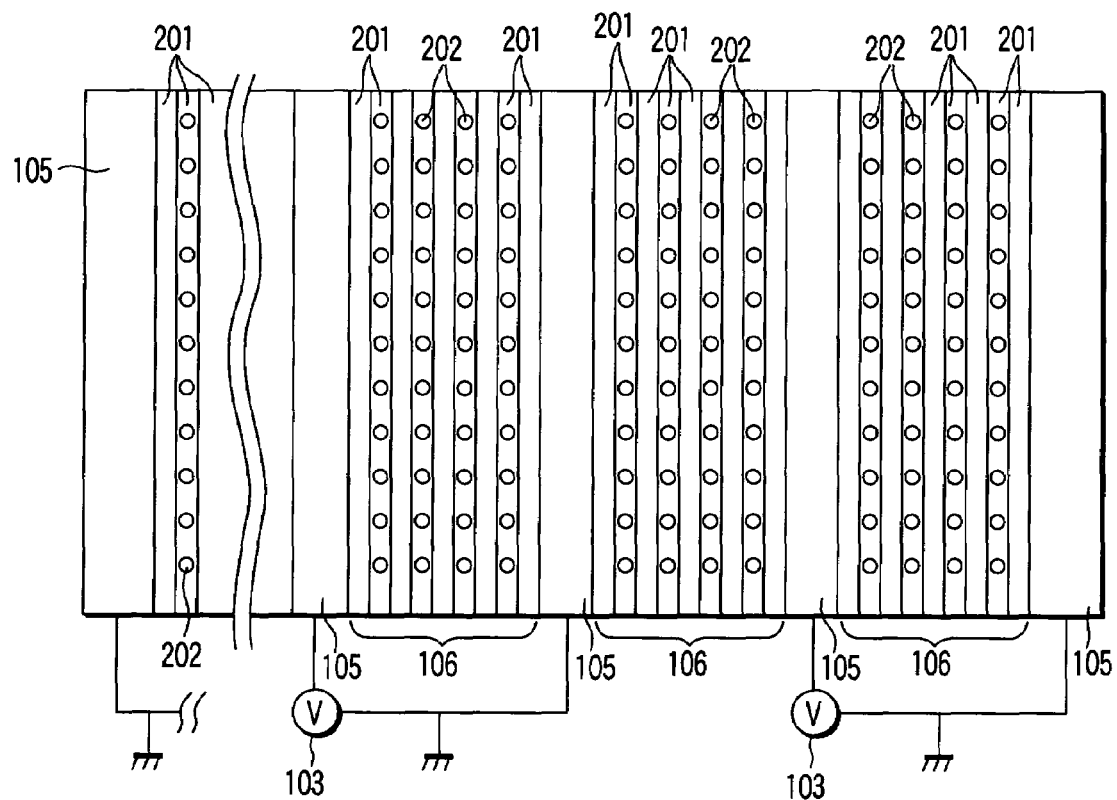
FIG. 6 is a schematic view illustrating connection example of the refractive index changeable element structure and energy level control units 103 incorporated in an electron injection unit.

Referring to FIG. 6, a description will be given of a specific experimental example in which the refractive index changeable element structure 104 is modified.

In this example, the barrier structure 201 is formed of polystyrene films, and the quantum dots 202 are formed of $C_{60}$ and dispersed in the polystyrene films. The polystyrene films containing the quantum dots 202 are stacked and held between the ITO transparent electrodes 105. To permit the potential difference of the ITO transparent electrodes 105 to be changed, each electrode (electron injection unit) 105 is connected to the energy level control unit 103 for the electron injection unit. In the refractive index changeable element structure shown in FIG. 6, ten units, each of which is formed of the transparent electrodes 105 and the polystyrene films held therebetween, are attached together.

As shown in FIG. 6, voltages were applied to the respective pairs of ITO transparent electrodes 105 so that the electrodes are alternately set to 0 volt (ground voltage), a predetermined Voltage V, 0 volt, the voltage V, . . . , from one outermost electrode to the other outermost electrode. In this state, firstly, the control unit 102 controlled the power voltage V to make it correspond to the ground level G1 shown in FIG. 3. Subsequently, the control unit 102 caused the light source 101A to emit an exciting light beam of 2.7 eV having a pattern to be recorded in the refractive index changeable element structure 104. After that, the control unit 102 instructed the electron injection unit 105 via the energy level control unit 103 to increase the energy level of the unit 105 to a value higher by 1.3 eV than the ground level G1 of the quantum dots, and instructed the light source 101A to stop the emission of a light beam. As a result, it was found that the pattern of the light beam was transferred to the polystyrene films containing $C_{60}$ in the form of a refractive index distribution figure.

In this example, the rate of change in the refractive index of a portion to which a light beam of the highest intensity was emitted was about 10%. Since this change was the change in the real part of the complex refractive index, the pattern could be recognized also when a light beam other than an exciting light beam $\omega 1$, e.g., a read light beam of 0.95 eV, was emitted to the refractive index changeable element structure. Digital data, as well as the pattern, could be recorded at a time. In this example, since polystyrene films serve as tunneling barriers, it is not necessary to form no particular barrier film between each ITO transparent electrode 105 and each polystyrene film containing $C_{60}$.

Furthermore, the same results as the above could be acquired even when a disk-shaped refractive index changeable element structure was formed, a light beam is emitted to this unit while rotating it, thereby recording data, and then reproducing the data by applying a read light beam to the data-recorded unit.

Figure 7:
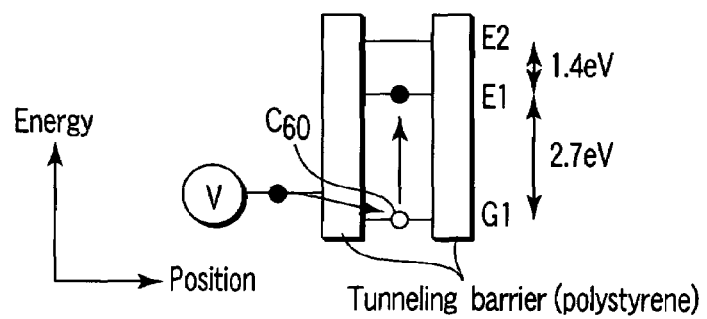
FIG. 7 is a view similar to FIG. 3, in which the quantum dot is $C_{60}$.

Referring to FIG. 7, another description will be given of the case where the barrier structure 201 is formed of polystyrene, and the quantum dots 202 are formed of $C_{60}$.

In the case of $C_{60}$ shown in FIG. 7, if, for example, the temperature of the quantum dots in the quantum structure 106 included in the refractive index changeable element structure 104 is 300K, kT indicating the degree of destabilization of energy due to temperature is about 0.026 eV. Further, in the case of $C_{60}$ shown in FIG. 7, since the energy gap between the ground level G1 and the excited level E1 is 2.7 eV, which is higher than 2 kT (=about 0.052 eV). In addition, in the case of $C_{60}$ shown in FIG. 7, since the energy gap between the excited levels E1 and E2 is 1.4 eV, which is also higher than 2 kT (=about 0.052 eV).

EXPERIMENTAL EXAMPLE 2

In the experimental example 1, if the ITO transparent electrodes as the electron injection unit were formed of gold, when the application of the voltage was stopped, the refractive index pattern disappeared. However, when the ITO transparent electrodes were formed of cesium, the pattern was left even after the application of the voltage was stopped.

EXPERIMENTAL EXAMPLE 3

Figure 8:
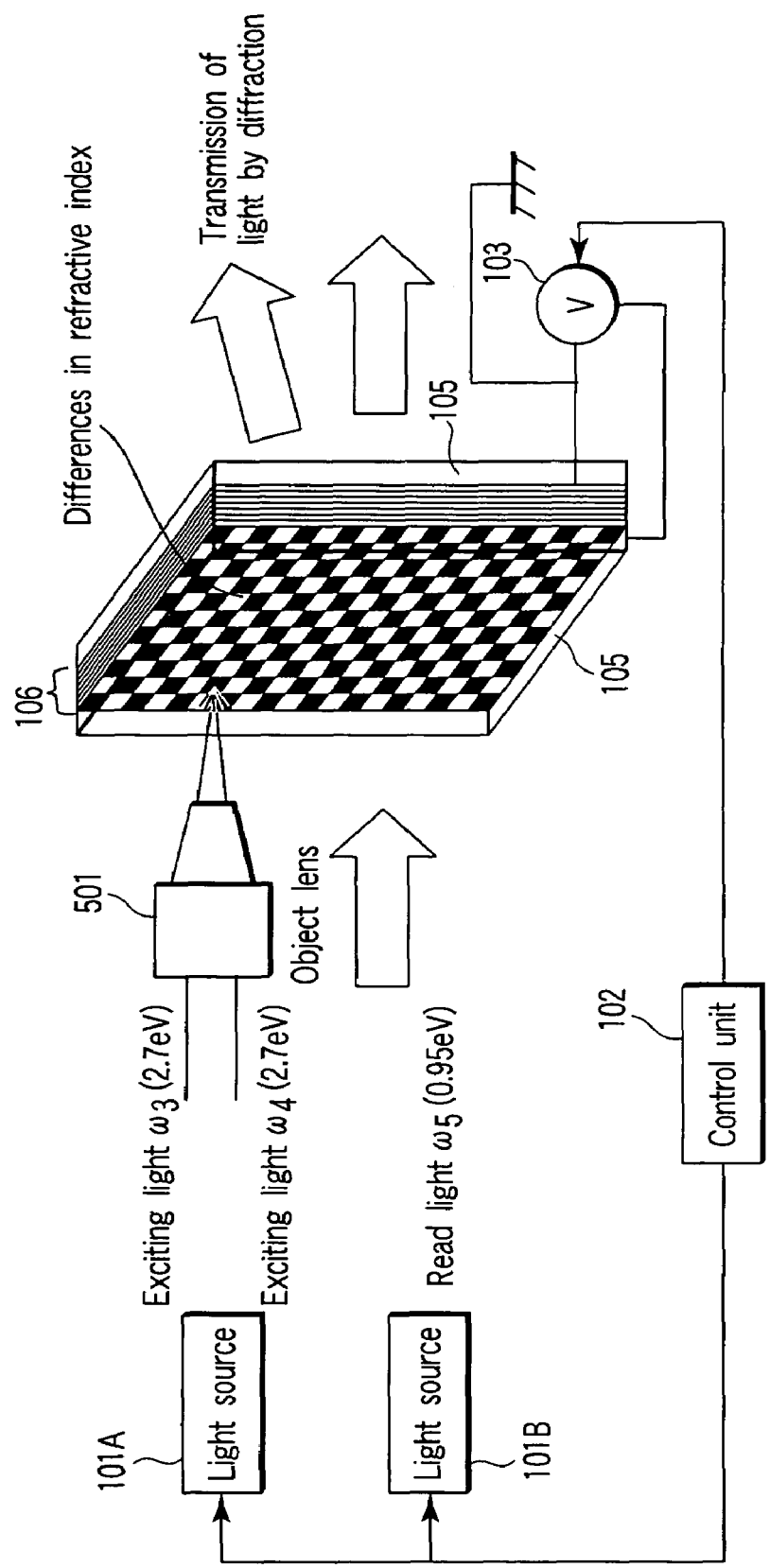
FIG. 8 is a view illustrating a refractive index changing apparatus in which two exciting light beams are made to interfere each other by an object lens.

In a third experimental example, two exciting light beams are made to interfere with each other by an object lens, and the resultant interference pattern is recorded in the quantum structure 106. This example will be described with reference to FIG. 8.

Two exciting light beams ω3 and ω4 (each having an energy level of 2.7 eV and a wavelength of about 460 nm) were made to interfere with each other by an object lens 501. The resultant light beam was emitted to the refractive index changeable element structure of the experimental example 1, whereby a light spot of an interference pattern was recorded in the quantum structure 106. This recording corresponds to recording of digital data. The density of the interference pattern was about 9 patterns per 1 cm². After that, when a light beam (read light beam) of 0.95 eV (with a wavelength of 1.3 μm) was emitted with a beam area of 1 cm² from the light source 101B, the light beam was diffracted at 9 points, thereby simultaneously reading data included in a beam spot.

EXPERIMENTAL EXAMPLE 4

In this example, CdSe nano crystals with a diameter of about 1.2 nm were used as the quantum dots 202, instead of $C_{60}$ in the experimental example 1. Further, an exciting light beam of 3.0 eV (with a wavelength of 410 nm) and a read light beam of 0.8 eV (with a wavelength of 1.55 μm) were used. As a result, the same results as acquired in the experimental example 1 could be obtained.

As described above, in the refractive index changing apparatus and method according to the embodiment of the invention, a light beam having energy capable of exciting, to an excited level, an electron of a ground level in a quantum dot that has discrete energy levels is emitted to the quantum dot. After that, an electron is injected into a position of the ground level in the quantum dot. As a result, a rate of change in refractive index that exceeds 1% can be acquired even in a transparent, and a change in refractive index can be recorded.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A refractive index changing apparatus comprising:
a plurality of quantum dots each having discrete energy levels including an energy level of a ground state and an energy level of an excited state, the excited level being higher than the ground level even if energy due to an ambient temperature is provided on the quantum dots;
a barrier structure unit formed of a dielectric which surrounds the quantum dots;
an injection unit configured to inject an electron into a position of the ground level in each of the quantum dots via the barrier structure unit, utilizing a tunneling effect, or to prevent injection of an electron into the position, injecting the electron or preventing injection of the electron controlled by changing an energy level of the injection unit, the injection unit configured to include two transparent electrodes between which the barrier structure unit is interposed;
a voltage applying unit configured to apply a voltage to each of the transparent electrodes;
a first light source which emits, to the quantum dots, a first light beam having first energy for exciting electrons from the ground level to the excited level;
a second light source which emits, to the quantum dots, a second light beam having second energy different from the first energy; and
a controller configured to control the voltage, the first light beam, and the second light beam,
wherein the injection unit injects the electron into the position to form a new outermost orbital outside an existing outermost orbital.

2. The apparatus according to claim 1, wherein when no voltage is applied to the injection unit, a first difference between the energy level of the injection unit and the ground level of each quantum dot is not less than the energy due to the ambient temperature, and a second difference between the energy level of the injection unit and the excited level of each quantum dot is not less than the energy due to the ambient temperature.

3. The apparatus according to claim 1, wherein the energy level of the injection unit falls within a width, the ground level of each quantum dot being varied within the width by the energy due to the ambient temperature.

4. The apparatus according to claim 1, wherein the energy level of the injection unit is higher than the ground level of each quantum dot by the energy due to the ambient temperature.

5. The apparatus according to claim 1, wherein an energy gap between the ground level and the excited level of each of the quantum dots is higher than 2 kT, k representing a Boltzmann constant, T representing an ambient temperature.

6. The apparatus according to claim 1, wherein an energy gap between the ground level and the excited level of each quantum dot is higher than energy defined by a Fermi-Dirac distribution function.

7. The apparatus according to claim 1, wherein each of the quantum dots is formed of at least one selected from a group containing a metal fine particle, a semiconductor fine particle, a fullerene molecule, a carbon nanotube and an organic molecule.

8. The apparatus according to claim 1, wherein the ground level and the excited level of each of the quantum dots is varied by kT or more when the injection unit injects the electron into each of the quantum dots, k representing a Boltzmann constant, T representing an ambient temperature.

9. A refractive index changing method comprising:
emitting, to a plurality of quantum dots, a light beam for exciting an electron from a position of a ground level of each quantum dot to an excited level, the quantum dots each having discrete energy levels including the ground level and the excited level, the excited level being higher than the ground level even if energy due to an ambient temperature is provided on the quantum dots; and
injecting the electrons into the ground level of each quantum dot utilizing a tunneling effect, or preventing the electrons from being injected into the ground level of each quantum dot by varying an energy level of an injection unit for injecting electrons into the quantum dots, via a barrier structure unit formed of a dielectric which surrounds the quantum dots, the injection unit including two transparent electrodes between which the barrier structure unit is interposed, the injection unit injecting the electron into the position to form a new outermost orbital outside an existing outermost orbital.

10. The method according to claim 9, wherein the energy level of the injection unit falls within a width, the ground level of each quantum dot being varied within the width by the energy due to the ambient temperature.

11. A refractive index changing apparatus comprising:
a plurality of quantum dots each having discrete energy levels including a ground level and an excited level, the excited level being higher than the ground level even if energy due to an ambient temperature is provided on the quantum dots;
a barrier structure unit formed of a dielectric which surrounds the quantum dots;
an injection unit configured to inject an electron into a position of the ground level in each of the quantum dots via the barrier structure unit, utilizing a tunneling effect, injecting the electron controlled by changing an energy level of the injection unit, the injection unit configured to include two transparent electrodes between which the barrier structure unit is interposed;
a voltage applying unit configured to apply a voltage to each of the transparent electrodes;
a first light source which emits, to the quantum dots, a first light beam having first energy for exciting electrons from the ground level to the excited level;
a second light source which emits, to the quantum dots, a second light beam having second energy different from the first energy,
a controller configured to control the voltage, the first light beam, and the second light beam,
wherein the injection unit injects the electron into the position to form a new outermost orbital outside an existing outermost orbital.

12. A refractive index changing apparatus comprising:
a plurality of quantum dots each having discrete energy levels including a ground level and an excited level, the excited level being higher than the ground level even if energy due to an ambient temperature is provided on the quantum dots;
a barrier structure unit formed of a dielectric which surrounds the quantum dots;
a preventing unit configured to prevent injection of an electron into the position, preventing injection of the electron controlled by changing an energy level of the injection unit, the preventing unit configured to include two transparent electrodes between which the barrier structure unit is interposed;
a voltage applying unit configured to apply a voltage to each of the transparent electrodes;
a first light source which emits, to the quantum dots, a first light beam having first energy for exciting electrons from the ground level to the excited level;
a second light source which emits, to the quantum dots, a second light beam having second energy different from the first energy; and
a controller configured to control the voltage, the first light beam, and the second light beam,
wherein the preventing unit injects the electron into the position to form a new outermost orbital outside an existing outermost orbital.

13. A refractive index changing method comprising:
emitting, to a plurality of quantum dots, a light beam for exciting an electron from a position of a ground level of each quantum dot to an excited level, the quantum dots each having discrete energy levels including the ground level and the excited level, the excited level being higher than the ground level even if energy due to an ambient temperature is provided on the quantum dots; and
injecting the electrons into the ground level of each quantum dot utilizing a tunneling effect by varying an energy level of an injection unit for injecting electrons into the quantum dots, via a barrier structure unit formed of a dielectric which surrounds the quantum dots, the injection unit including two transparent electrodes between which the barrier structure unit is interposed, the injection unit injecting the electron into the position to form a new outermost orbital outside an existing outermost orbital.

14. A refractive index changing method comprising:
emitting, to a plurality of quantum dots, a light beam for exciting an electron from a position of a ground level of each quantum dot to an excited level, the quantum dots each having discrete energy levels including the ground level and the excited level, the excited level being higher than the ground level even if energy due to an ambient temperature is provided on the quantum dots; and
varying an energy level of an injection unit for preventing electrons from being injected into the ground level of the quantum dots, via a barrier structure unit formed of a dielectric which surrounds the quantum dots, the injection unit including two transparent electrodes between which the barrier structure unit is interposed, the injection unit injecting the electron into the position to form a new outermost orbital outside an existing outermost orbital.

15. A refractive index changing apparatus comprising:
a plurality of quantum dots each having discrete energy levels including a ground level and an excited level, the excited level being higher than the ground level even if energy due to an ambient temperature is provided on the quantum dots;
a barrier structure formed of a dielectric which surrounds the quantum dots;
means for inject an electron into a position of the ground level in each of the quantum dots via the barrier structure, utilizing a tunneling effect, or to prevent injection of an electron into the position, injecting the electron or preventing injection of the electron controlled by changing an energy level of the injection means, the injection means including two transparent electrodes between which the barrier structure is interposed;

means for applying a voltage to each of the transparent electrodes;

means for emitting, to the quantum dots, a first light beam having first energy for exciting electrons from the ground level to the excited level;

means for emitting, to the quantum dots, a second light beam having second energy different from the first energy; and means for controlling the voltage, the first light beam, and the second light beam, wherein the injection means injects the electron into the position to form a new outermost orbital outside an existing outermost orbital.

* * * * *